United States Patent [19]

Molteni et al.

[11] Patent Number: 5,473,447
[45] Date of Patent: Dec. 5, 1995

[54] HEADS-UP AND HEADS-DOWN DISPLAYS EMPLOYING HOLOGRAPHIC STEREOGRAMS

[75] Inventors: William J. Molteni, Waltham, Mass.; William J. Volchok, Barcelona, Spain

[73] Assignee: Polaroid Corporation, Cambridge, Mass.

[21] Appl. No.: 195,322

[22] Filed: Feb. 14, 1994

[51] Int. Cl.$^6$ .............................. G02B 5/32; G03H 1/26; G03H 1/30
[52] U.S. Cl. .................. 359/13; 359/14; 359/22; 359/23
[58] Field of Search ................... 359/9, 23, 32, 359/22, 13, 14

[56] References Cited

U.S. PATENT DOCUMENTS

| | | | |
|---|---|---|---|
| 3,832,027 | 8/1974 | King | 350/3.5 |
| 4,206,965 | 6/1980 | McGrew | 359/23 |
| 4,339,168 | 7/1982 | Haines | 359/23 |
| 4,364,627 | 12/1982 | Haines | 359/23 |
| 4,411,489 | 10/1983 | McGrew | 359/23 |
| 4,421,380 | 12/1983 | McGrew | 359/23 |
| 4,445,749 | 5/1984 | Benton | 350/376 |
| 4,737,001 | 4/1988 | Moss | 350/3.6 |
| 4,778,262 | 10/1988 | Haines | 359/23 |
| 4,790,613 | 12/1988 | Moss | 350/3.7 |
| 4,807,951 | 2/1989 | Moss | 350/3.85 |
| 4,818,048 | 4/1989 | Moss | 350/3.7 |
| 4,830,442 | 5/1989 | Moss | 350/3.7 |
| 4,832,427 | 5/1989 | Nanba et al. | 350/3.72 |
| 4,834,476 | 5/1989 | Benton | 350/3.76 |
| 4,932,731 | 6/1990 | Suzuki et al. | 350/3.7 |
| 4,964,684 | 10/1990 | Iovine | 350/3.76 |
| 4,981,332 | 1/1991 | Smith | 350/3.6 |
| 4,998,784 | 3/1991 | Freeman et al. | 350/3.7 |
| 5,011,244 | 4/1991 | Smith et al. | 350/3.75 |
| 5,194,971 | 3/1993 | Haines | 359/32 |
| 5,237,433 | 8/1993 | Haines et al. | 359/9 |

OTHER PUBLICATIONS

S. A. Benton, Photographic Holography, SPIE, 1983, vol. 391, pp. 2–9.
S. A. Benton, Display Holography, SPIE, 1985, vol. 532, pp. 8–13.
D. J. DeBitetto, Holographic Panoramic Stereograms Synthesized from White Light Recordings, Applied Optics, vol. 8, No. 8, Aug. 1969, p. 1740.
M. C. King, A. M. Noll, and D. H. Berry, A New Approach to Computer–Generated Holography, Applied Optics, vol. 9, No. 2, Feb. 1970, pp. 471–475.
W. J. Molteni, Black and White Holographic Stereograms, Proceedings of the International Symposium on Display Holography, vol. 1, Jul. 12
G. Saxby, Practical Holography, 1988, pp. 55–59, 246–159, Prentice Hall, New York.
F. Unterseher, J. Hansen, B. Schlesinger, Holography Handbook, 1987, pp. 288–293, Ross Books, Berkeley, Calif.

Primary Examiner—Martin Lerner
Attorney, Agent, or Firm—John S. Vale

[57] ABSTRACT

Heads-up and heads-down displays employing holographic stereograms are provided. The stereograms can be oriented perpendicular to the user's line of sight (the "90° case") or at angle to the line of sight (the "non-90° case"). The stereograms are produced using a three-step process in which a series of two-dimensional perspective views are prepared, a $H_1$ hologram is prepared from the two-dimensional perspective views, and a $H_2$ hologram is prepared from the $H_1$ hologram. For the non-90° case, the two-dimensional perspective views are oriented at an angle relative to the plane of the $H_1$ hologram during the preparation of that hologram. Similarly, during the preparation of the $H_2$ hologram for this case, the $H_2$ hologram is oriented at an angle relative to the $H_1$ hologram. In this way, the viewing slits generated by the holographic stereogram are located in the vicinity of the user's eyes for the non-90° case as is desired. In certain embodiments, the two-dimensional perspective views are transformed prior to being recorded on the $H_1$ hologram.

17 Claims, 6 Drawing Sheets

HEADS-UP AND HEADS-DOWN DISPLAYS EMPLOYING HOLOGRAPHIC STEREOGRAMS

FIELD OF THE INVENTION

This invention relates to heads-up and heads-down displays and, in particular, to heads-up and heads-down displays employing holographic stereograms.

BACKGROUND OF THE INVENTION

A. Holographic Stereograms

Holographic stereograms originated in the late 1960's, one of the earliest publications in the field being that of Dominic J. DeBitetto entitled "Holographic Panoramic Stereograms Synthesized from White Light Recordings," *Applied Optics*, Vol. 8, No. 8, August 1969, pages 1740–1741.

As explained in the DeBitetto article, in accordance with the most basic embodiment of this technique, a series of two-dimensional photographs of an object are taken at different perspectives and then sequentially projected onto a diffusion screen using a coherent light source. Each image on the screen is holographically recorded on a portion of a photographic plate using a reference beam and a vertical slit aperture located just in front of the plate. The slit aperture is moved between exposures so that the finished plate is composed of a series of strip holograms, each strip containing interference information regarding one of the two-dimensional images and the location of the slit aperture when that two-dimensional image was recorded.

Illumination of the finished plate with laser light reconstructs all of the two-dimensional images. It also reconstructs the location of the slit for each of the images. When a viewer's eyes are placed in the vicinity of the reconstructed slits, each eye sees a different perspective view. The viewer's mind fuses these views together and interprets them as a three dimensional object, thus achieving three dimensionality from two two-dimensional images, as in a conventional stereogram.

General discussions of holographic stereograms and more advanced embodiments of this technique, including embodiments in which the reconstruction can be performed using incoherent light, can be found in G. Saxby, *Practical Holography*, Prentice Hall, New York, 1988, pages 55–59 and 246–259; F. Unterseher, J. Hansen, and B. Schlesinger, *Holography Handbook—Making Holograms the Easy Way*, Ross Books, Berkeley, Calif., 1987, pages 288–293; King et al., "A New Approach to Computer-Generated Holography," *Applied Optics*, Vol. 9, 1970, pages 471–475; U.S. Pat. No. 3,832,027; W. Molteni, Jr., "Black and White Holographic Stereograms," *Proceedings of the International Symposium on Display Holography*, Vol. 1, 1982, pages 15–21; S. Benton, "Photographic Holography," *SPIE*, Vol. 391 Optics in Entertainment, 1983, pages 2–9; W. Molteni, Jr., "Natural Color Holographic Stereograms By Superimposing Three Rainbow Holograms," *SPIE*, Vol. 462 Optics in Entertainment II, 1984, pages 14–18; W. Molteni, Jr., "Computer-Aided Drawing of Holographic Stereograms," *Proceedings of the International Symposium of Display Holography*, Vol. 2, 1985, pages 223–230; and S. Benton, "Display Holography—An SPIE Critical Review of Technology," *SPIE*, Vol. 532 Holography, 1985, pages 8–13.

With regard to certain of the embodiments of the present invention, Iovine, U.S. Pat. No. 4,964,684, discloses the use of a liquid crystal display matrix to form the vertical slit aperture employed in preparing the strip holograms of a holographic stereogram; Benton, U.S. Pat. No. 4,445,749, discloses a process for producing a holographic stereogram which is substantially achromatic; and W. Molteni, Jr., "Shear Lens Photography for Holographic Stereograms," *SPIE*, Vol. 1461 Practical Holography V, 1991, pages 132–139, discloses the use of shear lens photography to prepare the two-dimensional images from which a holographic stereogram is constructed. Each of these techniques can be used in connection with the practice of the present invention.

The use of predistorted two-dimensional images to form an alcove holographic stereogram is discussed in Benton, U.S. Pat. No. 4,834,476. In one embodiment, a series of undistorted perspective views are decomposed into columns and the columns are redistributed among the views to provide the desired predistortion. In another embodiment, anamorphic ray tracing is used to achieve the predistortion. Significantly, with regard to the present invention, predistortions suitable for use with an alcove stereogram are not suitable for use with a heads-up or heads-down display of the type disclosed herein.

B. Heads-Up and Heads-Down Displays

Heads-up and heads-down displays allow a user to simultaneously view two images, namely, a first (primary) image not provided by the heads-up or heads-down display and a second (secondary) image produced by the display.

For example, when used in an automobile, a heads-up display allows the user to view instrument information while simultaneously viewing the highway. Similarly, a heads-down display can be used to present additional information, such as, warning lights or turn signals, superimposed upon a conventional in-dash instrument panel. Along these same lines, in a game application, such as a pin-ball machine, a heads-down display allows the user to view information or a character related to the game and simultaneously to view the field of action.

In general terms, heads-up and heads-down displays provide two sets of information to a user without requiring the user to substantially redirect his or her eyes away from a primary viewing window such as the windshield or instrument panel of an aircraft, automobile, or other mechanized object.

Conventional optical elements have been used to project heads-up and heads-down images into the user's viewing area (line of sight). In some cases, holographic optical elements have been used in place of conventional lenses and mirrors. See, for example, Nanba et al., U.S. Pat. No. 4,832,427, and Suzuki et al., U.S. Pat. No. 4,932,731. Both continuously varying information (e.g., vehicle speed, targeting information, fuel status, etc.) and discretely varying information (e.g., turn signals, warning lights, and the like) have been presented to the user by means of these techniques.

Heads-up and heads-down images have also been formed by holographic techniques wherein the hologram both replaces some or all of conventional optical elements and contains image information. See, for example, Moss, U.S. Pat. Nos. 4,737,001, 4,790,613, 4,818,048, 4,807,951, and 4,830,442, and Smith et al., U.S. Pat. No. 5,011,244. The present invention is concerned with these types of displays hereinafter referred to as "image-containing holographic second image displays" or "IHDs".

In the past, IHDs have used holograms formed by conventional processes such that the finished holograms have contained both horizontal and vertical parallax information. That is, the holograms have been prepared by illuminating an object with laser light, providing a conventional reference beam, forming an interference pattern between the light reflected or transmitted by the object and the reference beam, and recording the interference pattern in a recording medium as a diffraction pattern. The images presented by the holograms have comprised either three dimensional solids or two dimensional objects suspended in space. Holograms of this type will be referred to hereinafter as "conventional holograms."

In a typical application, the hologram of an IHD is laminated into or onto a vehicle window. See, for example, Freeman et al., U.S. Pat. No. 4,998,784. Light from a light source located in, for example, the vehicle's dashboard is projected onto the hologram where it interacts with the hologram's diffraction pattern and produces the desired heads-up image. Corresponding geometries are used with heads-down displays.

The prior IHDs using conventional holograms have suffered from a number of problems. These problems have originated from the diffractive nature of the holographic process. Because a hologram diffracts incident light, its performance is wavelength dependent. The more wavelengths which are incident upon the hologram, i.e., the greater the bandwidth of the incoming light, the lower the resolution of the resulting image. This effect is known in the art as chromatic or color blur.

A basic approach to the color blur problem is to make the hologram a reflection hologram as opposed to a transmission hologram. Reflection holograms through the Bragg effect automatically generate an image composed of a select envelope of wavelengths from among the wavelengths produced by the light source. Although this approach helps with the color blur problem, it does not provide a complete solution.

In addition to the use of reflection holograms, other approaches to the color blur problem include (a) limiting the bandwidth of the incoming light and (b) confining the holographic image volume to the plane of the holographic recording medium.

The bandwidth of the incoming light can be limited by using a laser light source. Alternatively, a broadband light source can be used and then highly filtered to substantially reduce the bandwidth of the output.

Due to cost, the laser approach is impractical for large scale applications, such as, the automotive market. Also, lasers operate at specific wavelengths which may not meet the requirements of a particular application. Similarly, narrow bandwidth filters are generally expensive and even the narrowest filters commercially available are too broad to actually solve the color blur problem for practical systems. Also, such filters are inefficient and thus require strong light sources which are themselves expensive and lead to problems in the areas of power drain and heat generation.

Confining the holographic image volume to the plane of the holographic recording medium addresses the color blur problem because with such a geometry, the different wavelengths of a broadband light source do not have an opportunity to spread apart before they form the holographic image. Unfortunately, this solution to the color blur problem severely limits the usefulness of IHDs which employ conventional holograms. This is because heads-up and heads-down displays work best when the plane of the perceived image is substantially perpendicular to the user's line of sight. Windshields of vehicles are typically not perpendicular to the user's line of sight, and instrument panels are often not perpendicular. Yet, as discussed above, this is where holograms used to produce heads-up and heads-down displays in vehicles are normally mounted. Accordingly, confining the holographic image volume to the plane of the holographic recording medium is in general not a practical solution to the color blur problem for an IHD employing a conventional hologram.

Smith, U.S. Pat. No. 4,981,332, proposes a solution to the color blur problem in which two holograms are used—one to produce the image and the other to compensate for the bandwidth of the light source. This approach introduces its own problems in that compensating holograms are costly and difficult to make. Also, the presence of this component increases the complexity of the system, as well as limiting its use to those situations where the light source, the image hologram, and the compensating hologram can be located relative to the user and to each other to achieve the required spectral compensation of the image.

SUMMARY OF THE INVENTION

In view of the foregoing state of the art, it is an object of the present invention to provide improved heads-up and heads-down displays. More particularly, it is an object of the present invention to provide improved heads-up and heads-down displays employing holograms which contain image information, i.e., to provide improved IHDs. It is a specific object of the invention to provide improved IHDs which can be used with broadband light sources and not suffer from significant color blur. It is a further object of the invention to provide IHDs which do not suffer from significant color blur but yet can be readily and inexpensively manufactured. It is an additional object of the invention to provide IHDs which can be used with relatively weak light sources, such as, low powered incandescent lamps. It is a further object of the invention to provide IHDs of the foregoing types wherein the user perceives that the image produced by the IHD lies in a plane rotated relative to that of the hologram used in the IHD and/or is translated relative to the center of the hologram, including being made to appear in front of or behind the plane of the hologram.

To achieve the foregoing and other objects, the invention in accordance with certain of its aspects provides an optical system for displaying first and second images to a user comprising:

(a) a viewing window for viewing the first image, said first image being non-holographic and said viewing window presenting a field of view of the first image to the user;

(b) a substantially transparent holographic stereogram for forming the second image, said stereogram and said second image being in said field of view; and (c) a source of illumination for illuminating the stereogram to form the second image.

In certain preferred embodiments of the invention, the second image formed by the holographic stereogram is formed close to the hologram, i.e., within the physical volume occupied by the hologram or close to that volume. In this way, the color blur problem associated with a multi-wavelength light source is addressed since the formation of the image close to the hologram means that the multiple wavelengths do not have a chance to disperse before the image is formed. (Note that it is in this sense that the phrase "close to the physical volume of the hologram" and the phrase "close to the physical volume of the recording medium" are to be interpreted, i.e., close enough so that the user does not perceive a substantial color blur problem when viewing the second image.)

Significantly, placing the second image close to the hologram does not sacrifice three-dimensionality, as it would with a conventional hologram, since the stereogram relies on the use of different perspective views to achieve three-dimensionality, rather than on the actual three-dimensionality of the holographic image.

In terms of their physical form, the holographic stereograms of the invention will generally comprise a thin sheet of film (the holographic recording medium) which is either essentially flat or has a slight curvature, as will be the case when the hologram is mounted on a curved windshield. For ease of discussion, it will be assumed herein that a plane can be associated with the physical hologram whether the hologram is flat or slightly curved. This plane will be referred to herein as the "plane of the hologram." For ease of reference, a second image in or close to the volume of the hologram will then be referred to as being "in the plane of the hologram."

The present invention can be practiced in a 90° mode and in a non-90° mode (also referred to herein as the "tilted mode"). In the 90° mode, the viewer's line of sight intersects the plane of the hologram at 90° or at an angle substantially equal to 90°, e.g., within about 10° of 90°, while in the tilted mode, the plane of the hologram has a substantial tilt with respect to the viewer's line of sight, e.g., a tilt greater than about 10°. The 90° mode will most typically occur in heads-down displays, e.g., when the holographic stereogram is mounted on the cover of an instrument panel whose surface happens to be perpendicular to the user's line of sight, while the tilted mode will most typically occur in heads-up displays, e.g., when the holographic stereogram is mounted on a slanted vehicle windshield, although either mode can be used with either type of display. In general, most applications of the invention will involve the tilted mode.

The geometry of the tilted mode will be described herein in terms of a three dimensional Cartesian coordinate system whose center will be assumed to lie at the physical center of the holographic stereogram and in terms of "horizontal" and "vertical" axes defined by the user's line of sight, where the line of sight is assumed to lie in the plane defined by the optical axes of the user's eyes and to pass through the midpoint between the eyes.

Specifically, the term "horizontal axis" will be used to described an axis which is (a) normal to the line of sight and (b) passes through the user's two eyes, irrespective of whether that axis happens to be parallel to the "horizon." Similarly, the term "vertical axis" will be used to describe an axis normal to the line of sight and normal to the "horizontal axis."

The +z-axis of the Cartesian coordinate system will be assumed to extend from the hologram towards the user's eyes along the line of sight. The x and y axes of the coordinate system will be assumed to be parallel to the horizontal and vertical axes, respectively, with positive x being to the right and positive y being up as seen by the user.

In this coordinate system, a tilted holographic stereogram will be described by a pair of angles ($\alpha,\gamma$), where $\alpha$ is measured from the +z axis in the yz plane and $\gamma$ is measured from the +z axis in the xz plane. In terms of these angles, an $\alpha$ value less than 90° corresponds to a rotation of the hologram about the x-axis such that the top of the hologram moves towards the user, while an $\alpha$ value greater than 90° corresponds to a rotation of the top of the hologram away from the user. $\gamma$ values can be viewed as rotations about the y-axis, with positive $\gamma$'s corresponding to counterclockwise rotations and negative $\gamma$'s corresponding to clockwise rotations, respectively, as seen from below, i.e., when looking from negative to positive along the y-axis.

The 90° mode in its pure or exact form corresponds to $\alpha$ and $\gamma$ both equal to 90°. As discussed above, a holographic stereogram does not have to be exactly perpendicular to the viewer's line of sight for the 90° mode to apply. In terms of positive $\alpha$ and $\gamma$, the 90° mode can, in general, be used if $|90°-\alpha|$ and $|90°-\gamma|$ are both less than about 10°.

As discussed above, when reconstructed, a holographic stereogram not only reproduces the set of two-dimensional images recorded therein, but also reproduces an image of the vertical slit aperture used during the recording of the two-dimensional images. That is, when reconstructed, a holographic stereogram reproduces both a set of two-dimensional images and a set of vertical slits. It is this reproduced set of vertical slits, i.e., viewing slits, which provides the stereogram effect, in that when located in the general vicinity of the viewer's eyes, the slits allow each eye to essentially see only one of the two-dimensional images, which, in turn, causes the viewer's brain to fuse the two two-dimensional images into a single three dimensional image.

For the 90° mode, the set of slits can be located in the vicinity of the viewer's eyes using techniques of the type previously employed to produce holographic stereograms. These techniques are discussed in detail below in connection with the Description of the Preferred Embodiments of the invention.

Briefly, in accordance with these techniques, the two-dimensional images are typically formed on a diffusion screen and the holographic recording medium (specifically $H_1$; see below) is oriented parallel to the screen and at a distance D from the screen, where D is the "use distance" for the IHD, i.e., the nominal distance between the viewer's eyes and the plane of the hologram when the IHD is being used. The vertical slit aperture is located immediately in front of the holographic recording medium and thus is recorded as being 1) at a distance D from the two-dimensional image and 2) oriented parallel to the two-dimensional image. This relationship between the two-dimensional images and the images of the slits is maintained through to the production of the finished hologram (specifically $H_2$; see below). Accordingly, when the hologram is reconstructed and viewed at a distance D with the viewer's line of sight intersecting the hologram at about 90°, the two-dimensional images are seen at D and the slits are in the vicinity of the viewer's eyes as desired to achieve the stereogram effect.

The production techniques used for the 90° mode cannot be used for the tilted mode since upon reconstruction of the finished hologram, the slits will not be reproduced in the vicinity of the viewer's eyes. For example, if a holographic stereogram constructed in accordance with the techniques described above were to be mounted on a vehicle windshield oriented at an angle $\alpha$ above horizontal, upon reconstruction, the slits would be located at a distance D from the hologram along a line oriented at an angle of 90°−$\alpha$ below horizontal, i.e., for a seated driver of an automobile, the slits would be located in the vicinity of the driver's chest, not in the vicinity of his or her eyes.

In accordance with the invention, this problem is addressed and solved by means of a process for producing a holographic stereogram which, during use, is tilted with respect to the viewer's line of sight such that the intersection of the line of sight with the plane of the holographic stereogram is non-orthogonal, said process comprising the steps of:

(a) locating a first holographic recording medium in a first plane, said first plane having associated therewith a vertical axis and a horizontal axis;

(b) locating an image zone in a second plane, said second plane being oriented with respect to the first plane such that a normal to the first plane intersects the second plane at substantially the same angle as the viewer's line of sight will intersect the plane of the holographic stereogram during use;

(c) locating a slit aperture between the first holographic recording medium and the image zone, said slit aperture being adjacent to the first holographic recording medium, being oriented along said vertical axis, and being moveable along said horizontal axis;

(d) forming a sequence of two-dimensional images at the image zone, said slit aperture being located at a predetermined position along said horizontal axis for each of said two-dimensional images;

(e) sequentially holographically recording each of said two-dimensional images on said first holographic recording medium to form a $H_1$ hologram, said recording being performed using a first reference beam and said $H_1$ hologram including an image of the slit aperture at its predetermined position for each of the two-dimensional images;

(f) locating the $H_1$ hologram in a third plane;

(g) locating a second holographic recording medium in a fourth plane, said fourth plane being oriented with respect to the third plane such that a normal to the third plane intersects the fourth plane at substantially the same angle as the viewer's line of sight will intersect the plane of the holographic stereogram during use;

(h) illuminating the $H_1$ hologram so as to reconstruct simultaneously all of the recorded two-dimensional images in the vicinity of the second holographic recording medium and all of the recorded images of the slit aperture in the vicinity of the $H_1$ hologram; and (i) holographically recording the reconstructed two-dimensional images and the reconstructed images of the slit aperture to form a $H_2$ hologram, said recording being performed using a second reference beam.

Preferably, the distance between the center of the first holographic recording medium and the center of the image zone is D, i.e., the use distance. Similarly, the distance between the center of the second holographic recording medium and the center of the $H_1$ hologram is also preferably D.

Although the above process steps refer to four planes, the first plane can be the same as the third plane and the second plane can be the same as the fourth plane. Similarly, the reference beams of steps (e) and (i) can be the same. In this regard, however, it is preferable that the second reference beam have spatial characteristics similar to those of the illumination source which will be used with the finished hologram, e.g., similar to those of a source having a small spatial extent, while the first reference beam preferably is a collimated beam of light. Accordingly, in general, the first and second reference beams will be different.

When reconstructed, a $H_2$ hologram prepared in accordance with the above process (or, in the case of mass production, a copy of such a $H_2$ hologram) will produce the set of two dimensional images in the plane of the hologram, thus addressing the color blur problem, and will produce the set of slits along the line of sight at which the hologram is viewed, thus addressing the tilted hologram problem.

As discussed below in connection with the Description of the Preferred Embodiments, the angle of intersection of the viewer's line of sight with the plane of the holographic stereogram, and thus the angle of intersection of the normal to the first plane with the second plane and the angle of intersection of the normal to the third plane with the fourth plane, can be conveniently described in terms of the Cartesian coordinate system and the $\alpha$ and $\gamma$ angles discussed above.

A tilted-mode holographic stereogram produced by the above procedure has its two-dimensional images in the plane of the hologram which, by definition for this mode, is tilted with respect to the viewer's line of sight. Accordingly, the three-dimensional image which the user's brain forms from the two-dimensional images will appear to be tilted. In general, such a tilted three-dimensional image is not desired for most applications. Rather, what one would like the viewer to perceive is a three-dimensional image oriented perpendicular to the viewer's line of sight, i.e., an upright rather than a tilted three-dimensional image.

In accordance with the invention, this problem is addressed by transforming the two-dimensional images which are recorded by the $H_1$ hologram. This transformation can be conveniently described using two two-dimensional coordinate systems, namely, an (x',y') coordinate system which is used to describe the non-transformed two-dimensional image and an (x",y") coordinate system which is used to describe the transformed two-dimensional image. The centers (x',y'=0,0 and x",y"=0,0) of these coordinate systems are assumed to be coincident and to lie at the point where the viewer's line of sight would intersect the two-dimensional image if that two-dimensional image were located at the use location of the holographic stereogram.

As described in detail below in connection with the Description of the Preferred Embodiments, each non-transformed two-dimensional image is associated with a "perspective view angle" $\beta$. Specifically, as shown in FIG. 3, $\beta$ describes the deviation from straight ahead of each of the perspective views, with positive $\beta$'s corresponding to the viewer moving to his or her left relative to the object, negative $\beta$'s corresponding to movements to the right, and $\beta$ equal to zero corresponding to the straight ahead view.

Using the angle $\beta$ and the angles $\alpha$ and $\gamma$ defined above, the transformation from the (x',y') coordinate system to the (x",y") coordinate system can be written as follows:

$$x''=(x'\cdot\cos(\beta)\cdot\sin(\alpha)-y'\cdot\cos(\alpha)\cdot\cos(\gamma-\beta))/(\sin(\alpha)\cdot\sin(\gamma-\beta)) \quad (1)$$

$$y''=y' \quad (2)$$

Note that the above transformation reduces to x"=x' and y"=y' for the 90° mode, i.e., $(\alpha,\gamma)$ equal to (90°,90°).

The transformation of equations (1) and (2) can be implemented in various ways. For example, in the case where a set of two-dimensional images are already in existence, those images can be digitized and the transformation used to relocate the intensity values of the digitized images on a pixel by pixel basis, i.e., the intensity at location (x',y') on the original image is moved to location (x",y") on the transformed image. The transformed images are then used to produce the $H_1$ hologram.

In many cases, the two-dimensional images used in the practice of the invention will be computer generated. In such cases, the transformation of equations (1) and (2) can be performed directly during the generation of the two-dimensional images.

Rather than performing the transformation at the two-dimensional image stage, if desired, a distorted three-dimensional object can be constructed and then photographed at different perspective view angles to form the two-dimensional images. The mathematical transformation of equations (1) and (2) can be used to design the distorted three-dimensional object or that object can be constructed empirically so that when viewed in a tilted position, the object appears to be upright.

In addition to compensating for the tilt of the plane of the hologram, the transformations of equations (1) and (2) can be generalized so that the three-dimensional image formed by the viewer's mind appears to be either in front of or behind the plane of the hologram and/or above or below the point of intersection of the viewer's line of sight with the hologram. The more generalized transformation is given by the following equations (3) and (4) where Z' represents the location of the three-dimensional image along the z-axis as perceived by the viewer (+Z' values corresponding to the image appearing closer to the viewer) and Y' represents the location of the three-dimensional image along the y-axis, again as perceived by the viewer (+Y' values corresponding to the image appearing above the viewer's line of sight):

$$x''=(x'\cdot\cos(\beta)\cdot\sin(\alpha)+Z'\cdot\sin(\beta)\cdot\sin(\alpha)-(y'+y')\cdot\cos(\gamma-\beta))/(\sin(\alpha)\cdot\sin(\gamma-\beta)) \quad (3)$$

$$y''=y'+y' \quad (4)$$

It should be noted that the transformations of equations (3) and (4) can also be used with the 90° mode, that is, the perceived image can be made to appear in front of or behind and/or above or below the center of a holographic stereogram whose plane is perpendicular to the user's line of sight.

In the most general case, the perceived image can also be made to appear to the left or right of the center of the hologram, the transformation in this case being as follows where X' represents the location of the three-dimensional image along the x-axis as perceived by the viewer (+X' values corresponding to the image appearing to the right of the viewer's line of sight):

$$x''=((x'+X')\cdot\cos(\beta)\cdot\sin(\alpha)+Z'\cdot\sin(\beta)\cdot\sin(\alpha)-(y'+Y')\cdot\cos(\alpha)\cdot\cos(\gamma-\beta))/(\sin(\alpha)\cdot\sin(\gamma-\beta)) \quad (5)$$

$$y''=y'+Y' \quad (6)$$

In most cases, a left/right transformation will be easier to achieve by simply translating the holographic stereogram along the horizontal axis rather than by changing the perceived location of the three-dimensional image produced by the stereogram. Accordingly, the transformation of equations (3) and (4) will more often be used than that of equations (5) and (6).

Instead of using a mathematical transformation, the perceived location of the three-dimensional image produced by the holographic stereogram can also be changed by changing the location of the object relative to the camera during the recording of the two-dimensional perspective views, e.g., by moving the object relative to the point of intersection of lines 41 in FIG. 3.

In summary, the present invention provides improved heads-up and heads-down displays for use in vehicles, games, and other applications. With the displays, movement of the user's eyes in the horizontal direction results in the sensation of looking around a three-dimensional object. In this way, the displays provide a unique, attention-getting image to the user.

BRIEF DESCRIPTION OF THE DRAWINGS

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

Like reference characters are used in the drawings to designate like or corresponding elements of the various embodiments of the invention. Briefly, the subject matter of the drawings is as follows.

DESCRIPTION OF THE PREFERRED EMBODIMENTS

As discussed above, the present invention relates to heads-up and heads-down display systems which employ a stereogram to produce a secondary holographic image which can be viewed in the field of view of a primary non-holographic image.

Figure 1:
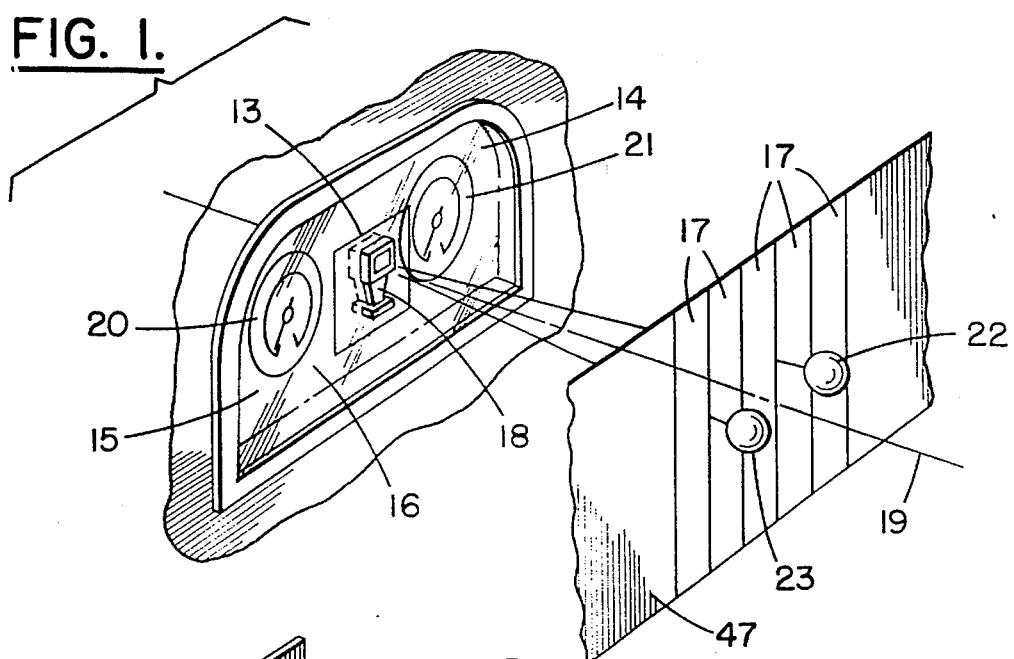
FIG. 1 is a schematic diagram illustrating a 90° mode, heads-down display constructed in accordance with the invention.
Figure 2:
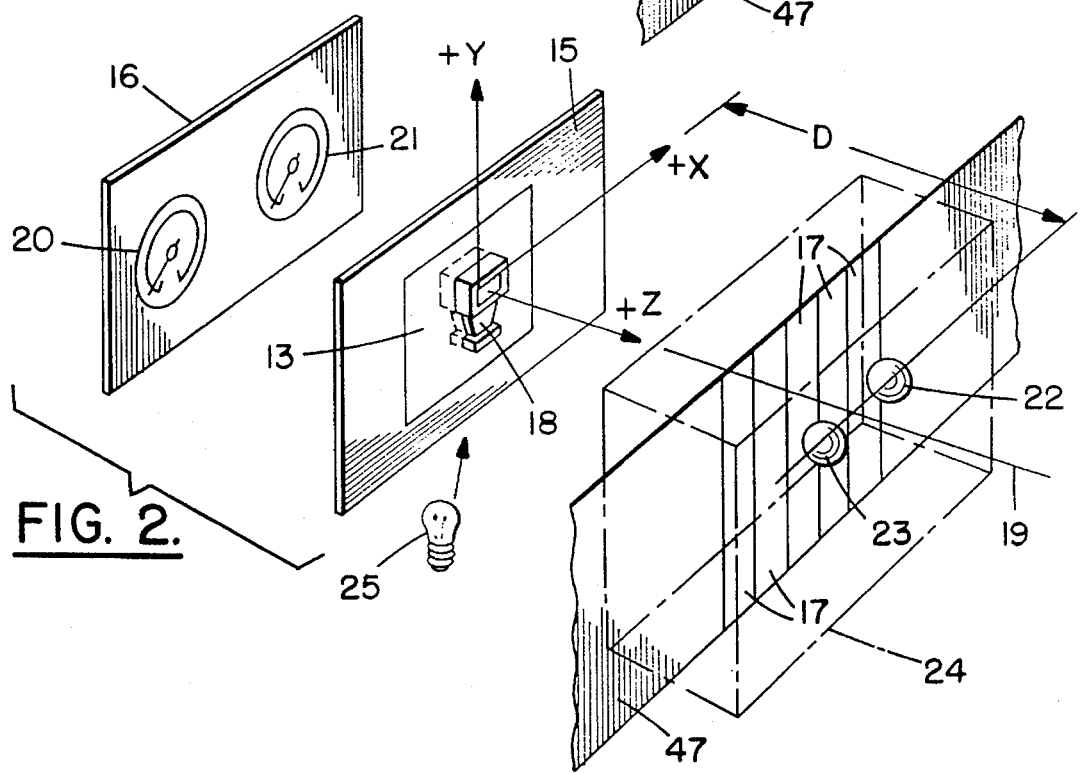
FIG. 2 is an exploded view illustrating the geometry of the 90° mode of FIG. 1 in more detail.

FIGS. 1 and 2 illustrate an instrument panel application of the invention wherein viewing window 15, through which first or primary image 16 is viewed, and holographic stereogram 13, which produces secondary image 18, are substantially perpendicular to the observer's line of sight 19, i.e., these figures illustrate the 90° case discussed above.

For purposes of illustration, in FIGS. 1–2, primary image 16 is shown as comprising gauges 20 and 21 and secondary image 18, which is superimposed upon the primary image, is shown as comprising a gas pump which can, for example, symbolize a low fuel condition. Although not explicitly illustrated in FIGS. 1–2, instrument panel 14 will normally be located below eye level so that the overall configuration of FIGS. 1 and 2 is that of a heads-down display.

As shown in FIGS. 1–2, holographic stereogram 13 has been applied directed to viewing window 15. Alternatively, the stereogram can be placed in front of or behind the viewing window provided that the observer's line of sight when looking through at least some portion of the viewing window passes through the stereogram and thus the image which the stereogram produces. As will be evident, this freedom of choice regarding the location of the holographic stereogram also applies to the non-90° mode, as well as to heads-up displays.

Illumination of stereogram 13 is provided by light source 25. For a reflection hologram, the light source is located in front of the hologram as shown in FIG. 2. For a transmission hologram, the light source is located behind the hologram. Either type of hologram can be used in the practice of the invention, although reflection holograms are generally preferred, especially for heads-up displays.

As shown in FIG. 2, light source 25 is located below stereogram 13. Alternatively, the illumination can be from above the stereogram or can be accomplished by edge or shallow angle illumination techniques known in the art. The light source can also be located to the side of the stereogram if desired, although this is not a preferred location since it can lead to color blur problems. In a typical application, the light source will be activated when information is to be provided to the observer, e.g., in the case of the fuel pump image of FIGS. 1–2, when the fuel level in the vehicle's gas tank falls below a predetermined level.

In accordance with the invention, stereogram 13 can be illuminated with a broadband source such as a tungsten halogen bulb or other inexpensive light source. That is, the illumination does not have to have substantial temporal coherence. Of course, a temporally coherent source, such as a laser or a narrowly-filtered broadband source, can be used if desired. If a colored image is desired, a simple, inexpensive filter can be used with the broadband source.

Preferably, the light source should have a small physical size, i.e., it should have at least some spatial coherence. In particular, a light source whose size in the horizontal direction (x-direction in FIG. 2) is less than about 2 millimeters is preferred and one less than about 1 millimeter is even more preferred. Such a source will produce sharp holographic images when spaced from the stereogram by a distance of at least about 100 millimeters. In general, the shift in the locations of the slits formed by the stereogram in the vicinity of the user's eyes attributable to the horizontal spatial extent of the light source is preferably less than about 25% of the size of one of the viewing slits generated by the stereogram (see below). Greater shifts, however, can be tolerated depending upon the specifics of the illumination and viewing configuration and the nature of the holographic image. In general, the size of the light source in the vertical direction (y-direction in FIG. 2) is of less importance since the stereogram only contains horizontal parallax information. Similarly, the spatial extent of the light source along the line of sight (z-direction in FIG. 2) is of less importance. Notwithstanding the lesser importance of these dimensions, the basic guideline remains that the smaller the physical size of the light source the better.

The foregoing considerations regarding illumination of the holographic stereogram, including the locations and types of sources which can be used, apply generally to both the 90° and non-90° modes, to both heads-up and heads-down displays, and to both reflection and transmission holograms, except where noted.

In FIGS. 1–2, viewing window 15 has been shown as being flat, although in practice the viewing window will often have at least a slight, usually compound, curvature. For example, the clear protective covers for vehicle instrument panels, as well as vehicle windshields, typically have such a curvature. The holographic stereograms of the invention generally have a sufficiently small physical size so that they can be approximated by a plane even when mounted on a curved surface (see discussion above in the Summary of the Invention). In addition, the human eye is able to compensate fairly well for distortions in the holographic image resulting from curvature of the stereogram when mounted on a curved surface.

In accordance with the principles discussed above, when illuminated, holographic stereogram 13 produces: 1) a sequence of real images of vertical viewing slits 17 in the vicinity of the user's eyes 22 and 23; and 2) a sequence of two-dimensional images in the plane of the hologram, one image being viewable through each of the viewing slits. In practice, the user's eyes are assumed to be located in a three-dimensional "eyebox" which represents the range of eye locations for typical users of the apparatus or equipment with which the stereogram is associated. Such an "eyebox" is identified by the reference numeral 24 in FIG. 2.

Because of the robustness of the stereogram approach to the formation of three-dimensional images, the exact location of the sequence of viewing slits with respect to the eyebox is generally not critical. That is, the user will perceive the desired three-dimensional image even if the sequence of viewing slits is in front of or even behind the pupils of his or her eyes. Nevertheless, in designing the stereograms of the invention, the sequence of viewing slits is normally placed at approximately the center of the eyebox. The use distance "D" discussed above is then the distance from the center of the eyebox to the physical center of the holographic stereogram.

For the 90° mode, holographic stereogram 13 can be made by a three step process. First, a series of two-dimensional images of the object to be displayed are prepared from different horizontal perspectives. Preferably, these two-dimensional perspective views are prepared utilizing a technique which is free from keystone distortion such as a technique employing a shear lens. See, for example, W. Molteni, Jr., "Shear Lens Photography for Holographic Stereograms," *SPIE*, Vol. 1461 Practical Holography V, 1991, pages 132–139.

Figure 4:
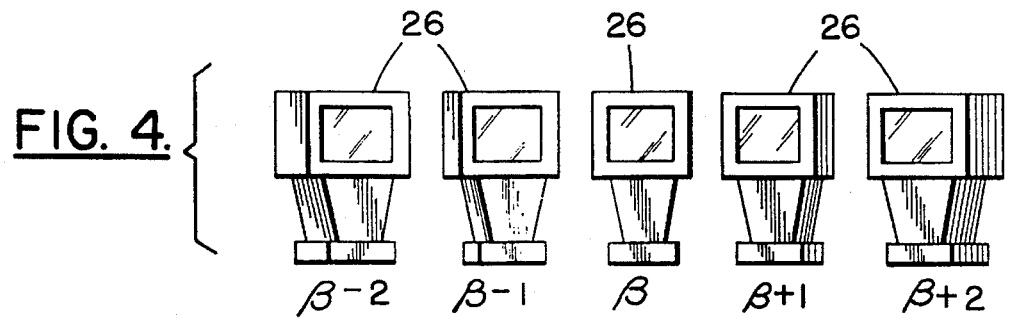
FIG. 4 shows an illustrative set of two-dimensional perspective views prepared using the procedures of FIG. 3.
Figure 3:
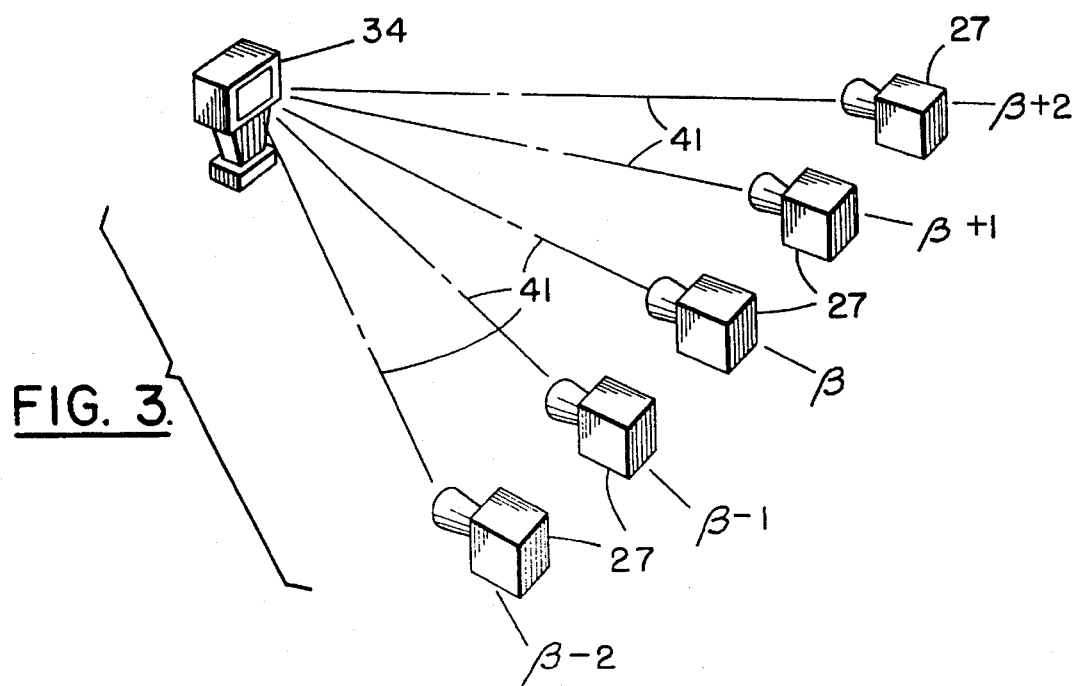
FIG. 3 is a schematic diagram illustrating the preparation of a sequence of two-dimensional perspective views for use in constructing the holographic stereograms of the invention.

FIG. 3 schematically illustrates the taking of perspective views of a gas pump 34 for use as, for example, a low fuel indicator. Five representative positions of camera 27 are shown in this figure identified by the angular positions β–2 through β+2. The two-dimensional images 26 obtained at these locations are shown in FIG. 4. In practice, these images are normally recorded on a roll of photographic film as shown schematically at 42 in FIG. 5. As discussed below, many more perspective views are used in practice to produce the desired three-dimensional effect, e.g., between about 25 and about 150 perspective views for a typical application of the invention. Rather than using photographic film, other recording media can be used, such as videotape. Also, a CCD camera which directly digitizes the image can be used.

Figure 5:
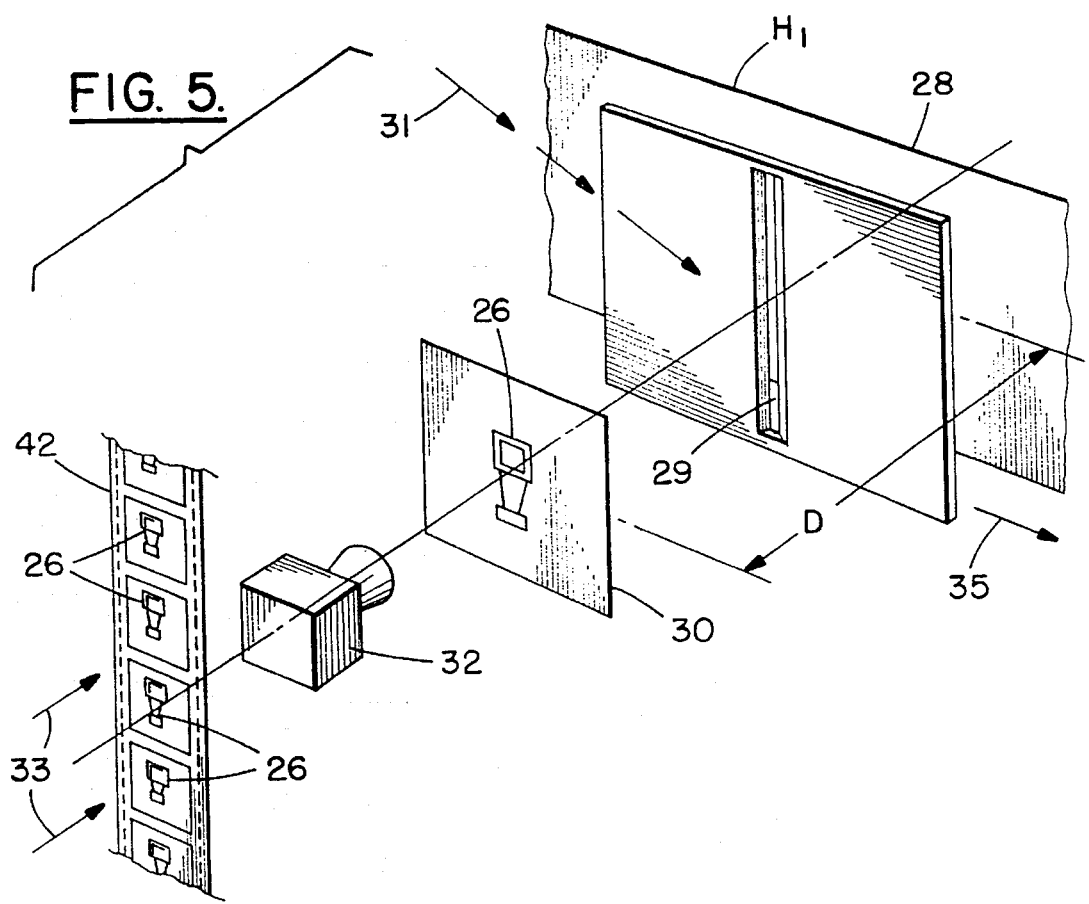
FIG. 5 is a schematic diagram illustrating the preparation of a $H_1$ hologram for the 90° mode.

The second step in the production of holographic stereogram 13 involves the production of a first $H_1$ hologram using the two dimensional perspective images of FIG. 4. This hologram is normally of the transmission type. Its preparation is schematically illustrated in FIG. 5.

As shown therein, the two-dimensional perspective images 26 of FIG. 4 are sequentially projected onto diffusion screen 30 by projector 32 using coherent light, e.g., laser beam 33. A moveable slit aperture 29 is positioned in front of holographic recording plate 28, masking all but a thin vertical strip of the plate. A mechanical slit can be used for this purpose or the slit can be formed electronically or optically. See, for example, Iovine, U.S. Pat. No. 4,964,684, and McGrew, U.S. Pat. No. 4,411,489.

The location of slit aperture 29 is selected so that its ultimate real image in front of the operator's eye (i.e., slits 17 in the figures) will allow the eye to see the appropriate perspective view for the location of the eye. That is, the location of the slit aperture is selected based on the $\beta$ angles in FIG. 3. The movement of slit aperture 29 for the different perspective views is shown schematically in FIG. 5 by arrow 35.

In practice, slit aperture 29 will have a width on the order of 2–4 millimeters, i.e., on the order of the diameter of the pupil of a human eye, so that between about 25 and about 150 slits 17 are used for a hologram designed for an eyebox having a horizontal dimension on the order of 100–300 millimeters, which is typical for a vehicle application of the invention. The slits are preferably contiguous to one another, although slightly overlapping or slightly separated slits can be used if desired. In the figures, five contiguous slits are shown for purposes of illustration.

In order to form a holographic image, in addition to the light coming from diffusion screen 30, holographic plate 28 also simultaneously receives reference beam 31. Typically, beams 31 and 33 are derived from the same laser source using, for example, suitably placed beam splitters (not shown). Preferably, the reference beam is collimated and strikes the plate along the direction of slit aperture 29.

Once fully exposed with the complete series of perspective views, one view for each slit location, holographic plate 28 is developed using conventional techniques. The plate itself can be composed of any suitable material for recording holograms, e.g., a silver halide emulsion on a glass substrate.

The last step in the three-step process involves making a second $H_2$ hologram from the projected real image of $H_1$. This second hologram or a copy thereof is the holographic stereogram 13 used in the practice of the invention.

Figure 6:
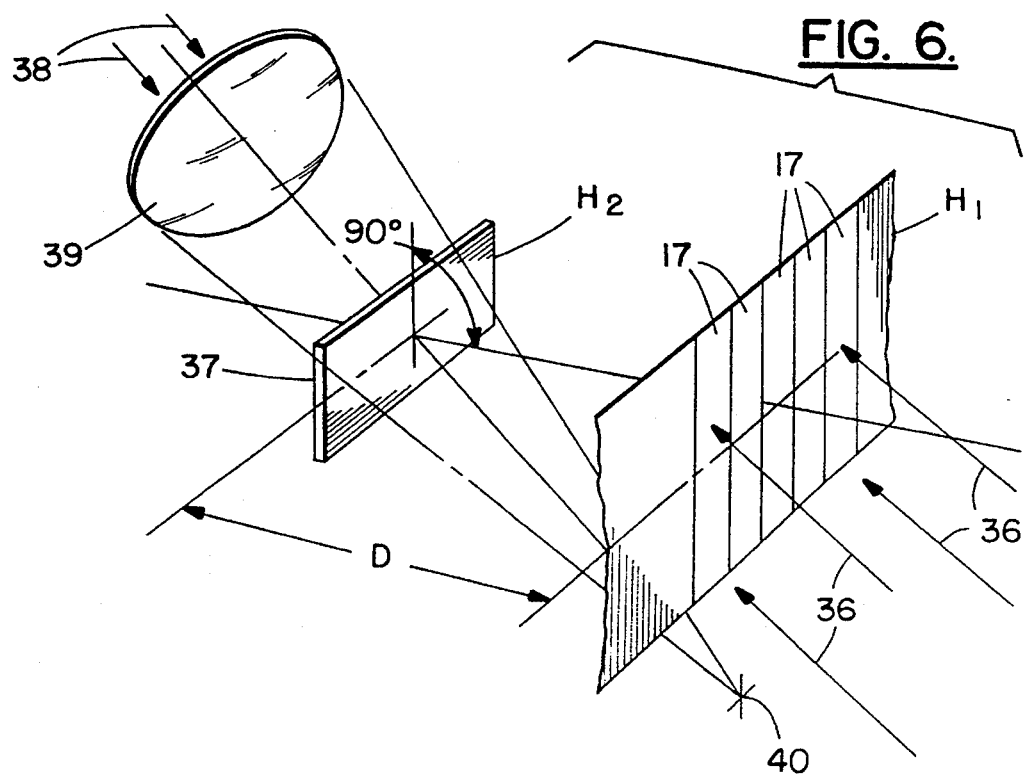
FIG. 6 is a schematic diagram illustrating the preparation of a $H_2$ hologram from the $H_1$ hologram of FIG. 5.

FIG. 6 shows a suitable configuration for making a reflective-type $H_2$ from the $H_1$ of FIG. 5. A similar configuration is used to make a transmission-type $H_2$, the primary difference being that the reference and object beams strike the holographic recording plate from the same side for a transmission-type $H_2$ rather than from opposite sides as in FIG. 6.

As shown in FIG. 6, the $H_1$ hologram of FIG. 5 is reverse conjugate illuminated using collimated, coherent illumination beam 36. This illumination simultaneously reproduces all of the two-dimensional perspective views at holographic recording plate 37. The illumination also simultaneously reproduces slit aperture 29 at all the locations at which the slit aperture was located during the recording of the $H_1$ hologram. These reproduced slit apertures constitute the slits 17 which produce the stereogram effect. The reproduced slit apertures are identified by the reference numeral 17 in FIG. 6.

So as to create a holographic recording of the two-dimensional perspective views and the slits 17, holographic recording plate 37 is illuminated with coherent reference beam 38. As in FIG. 5, beams 36 and 38 are typically derived from the same laser source using, for example, suitably placed beam splitters (not shown).

Preferably, reference beam 38 is selected so as to have spatial characteristics similar to those of the illumination source which will ultimately be used with the finished hologram. Thus, in FIG. 6, a lens system shown schematically at 39 is used to produce a reference beam which converges to point 40. Point 40 and its spacing from plate 37 correspond to the location of light source 25 and its spacing from holographic stereogram 13 in FIG. 2.

Once exposed, holographic plate 37 is developed using conventional techniques to form the $H_2$ hologram. As with plate 28 of FIG. 5, plate 37 of FIG. 6 can be composed of any suitable material for recording holograms. As discussed above, the $H_2$ hologram, or a copy thereof, constitutes the holographic stereogram 13 used in the practice of the invention.

Figure 7:
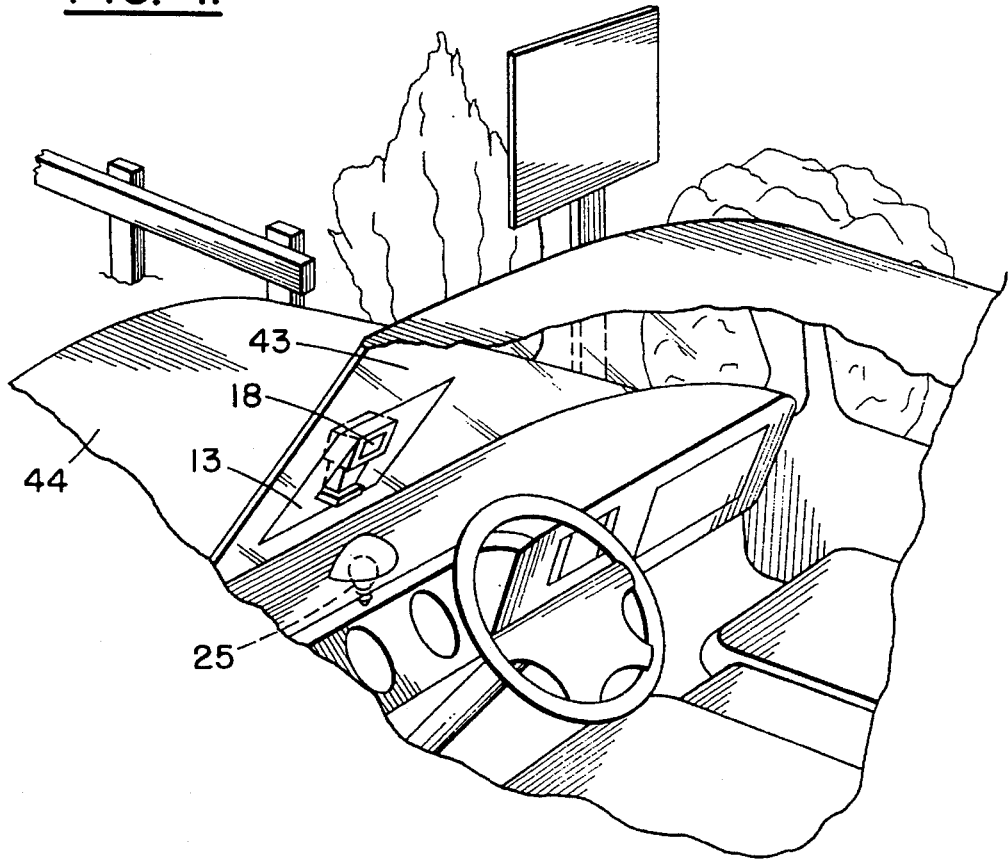
FIG. 7 is a schematic diagram illustrating a non-90° mode, heads-up display constructed in accordance with the invention.
Figure 8:
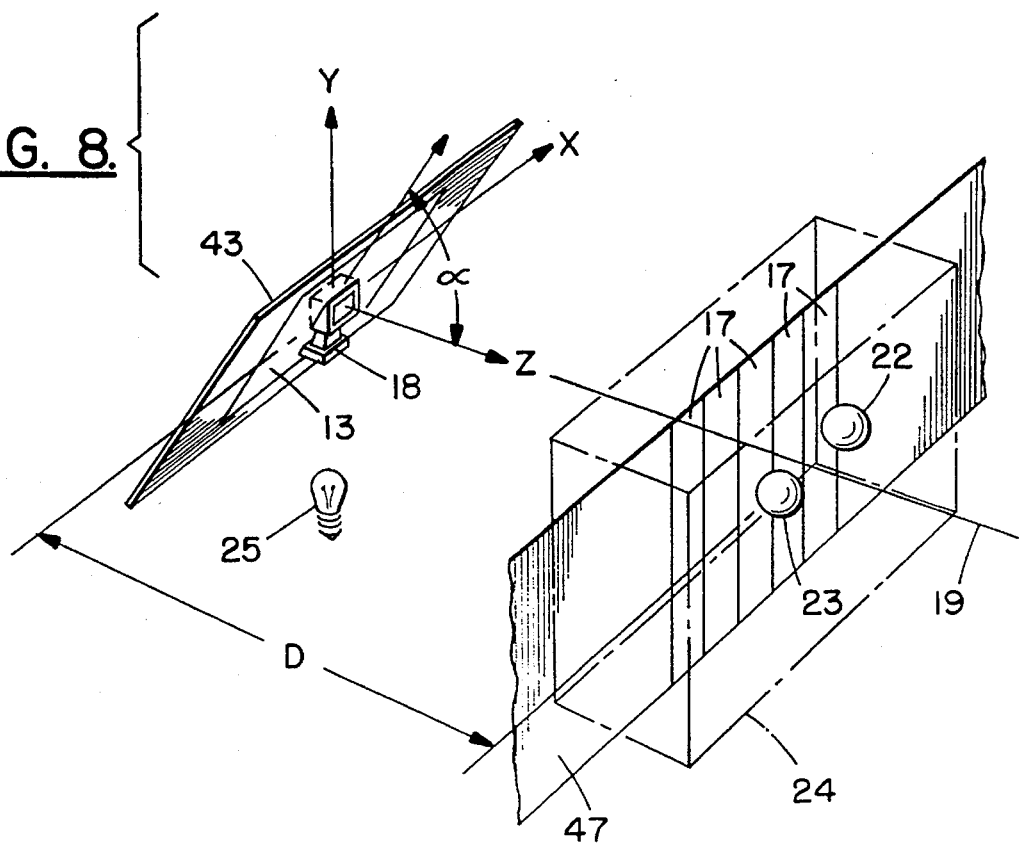
FIG. 8 is a schematic diagram illustrating the geometry of the non-90° mode of FIG. 7 in more detail.

The discussion up to now has concerned the 90° case. FIGS. 7 and 8 illustrate the non-90° case for a heads-up display in which holographic stereogram 13 is carried by windshield 43 of automobile 44. When light source 25 is activated, transparent hologram 13 produces an image 18 which an operator whose eyes are located in eyebox 24 can see superimposed upon the external scene viewable through the windshield. As discussed above, by means of, for example, the transformation of equations (3) and (4), image 18 can be in front of, behind, or bisected by the windshield. The bisected case is shown in FIGS. 7 and 8.

Figure 12:
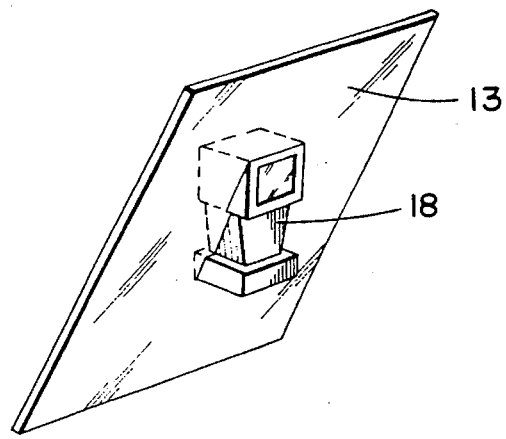
FIG. 12 illustrates the upright, three dimensional image which a user will perceive when viewing a holographic stereogram constructed in accordance with FIGS. 9 and 10 using the transformed two-dimensional perspective views of FIG. 11.
Figure 13A:
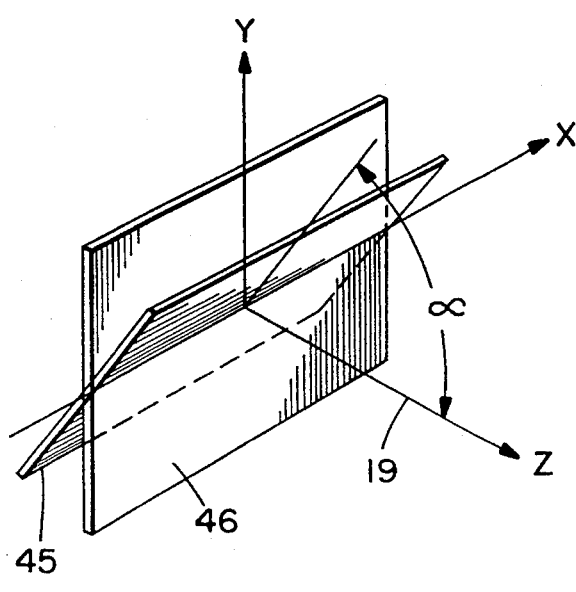
FIGS. 13A and 13B are schematic diagrams illustrating the definitions of the angles $\alpha$ and $\gamma$ used herein to describe the orientation of the holographic stereogram with respect to the user's line of sight. The 90° mode corresponds to $\alpha$ and $\gamma$ both equal to 90°, while the non-90° mode corresponds to either or both of $\alpha$ and $\gamma$ being substantially different from 90°.
Figure 13B:
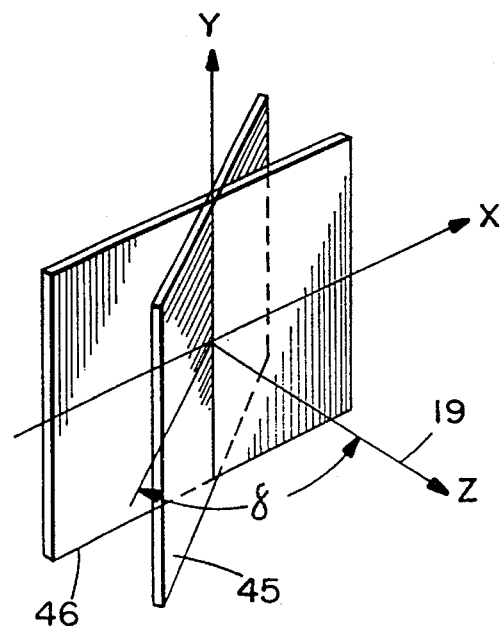

The geometry for the general non-90° case is shown in FIGS. 13A and 13B. As shown therein, plane 45, which is the plane of the holographic stereogram, can be rotated relative to plane 46, which is the plane normal to the user's line of sight 19, by either or both of angles $\alpha$ and $\gamma$. For ease of presentation, in FIGS. 7 through 12, it has been assumed that the plane of the hologram has only been rotated by the angle $\alpha$, it being understood that the same principles apply to a rotation by the angle $\gamma$ or a rotation by both the angle $\alpha$ and the angle $\gamma$.

The process of producing a holographic stereogram for the non-90° case involves the same three steps as that employed for the 90° case, i.e., the preparation of a series of two-dimensional perspective views, the preparation of a $H_1$ hologram from the perspective views, and the preparation of a $H_2$ hologram from the $H_1$ hologram.

If desired, the same two-dimensional perspective views can be used for the non-90° case as used for the 90° case. However, since these two-dimensional views will be observed at an angle to the viewer's line of sight, e.g., at the angle $\alpha$ in FIG. 8, the resulting three-dimensional image will in general appear unacceptably distorted to the user. Accordingly, in the preferred embodiments of the invention, the two-dimensional perspective views are transformed using equations (1) and (2) above prior to the preparation of the $H_1$ hologram.

Figure 11:
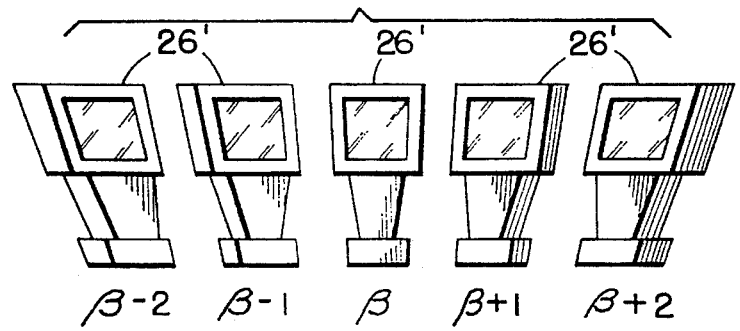
FIG. 11 shows an illustrative set of transformed two-dimensional perspective views for use with the non-90° mode.

FIG. 11 shows the effect of such a transformation on the two-dimensional images of FIG. 4 for $\alpha$ equal to approximately 30° and $\beta-2$, $\beta-1$, $\beta$, $\beta+1$, and $\beta+2$ equal to approximately +17°, +8.5°, 0°, −8.5°, and −17°, respectively. The transformed two-dimensional perspective views of FIG. 11 are identified by the reference numeral 26' to distinguish them from the untransformed views of FIG. 4 which are identified by the same reference numeral without the prime.

FIG. 12 shows the three-dimensional image which a user will perceive when viewing the two-dimensional images of FIG. 11 at angle α. As can be seen in this figure, three-dimensional image 18 appears undistorted and oriented normal to the viewer's line of sight as is desired.

As discuss above, in addition to transforming the two-dimensional perspective views to deal with the α and/or γ rotations, those views can also be transformed in accordance with equations (3) and (4) or equations (5) and (6) so that the three-dimensional image appears to be translated relative to the center of the holographic stereogram along any or all of the x, y, and z axes.

Figure 9:
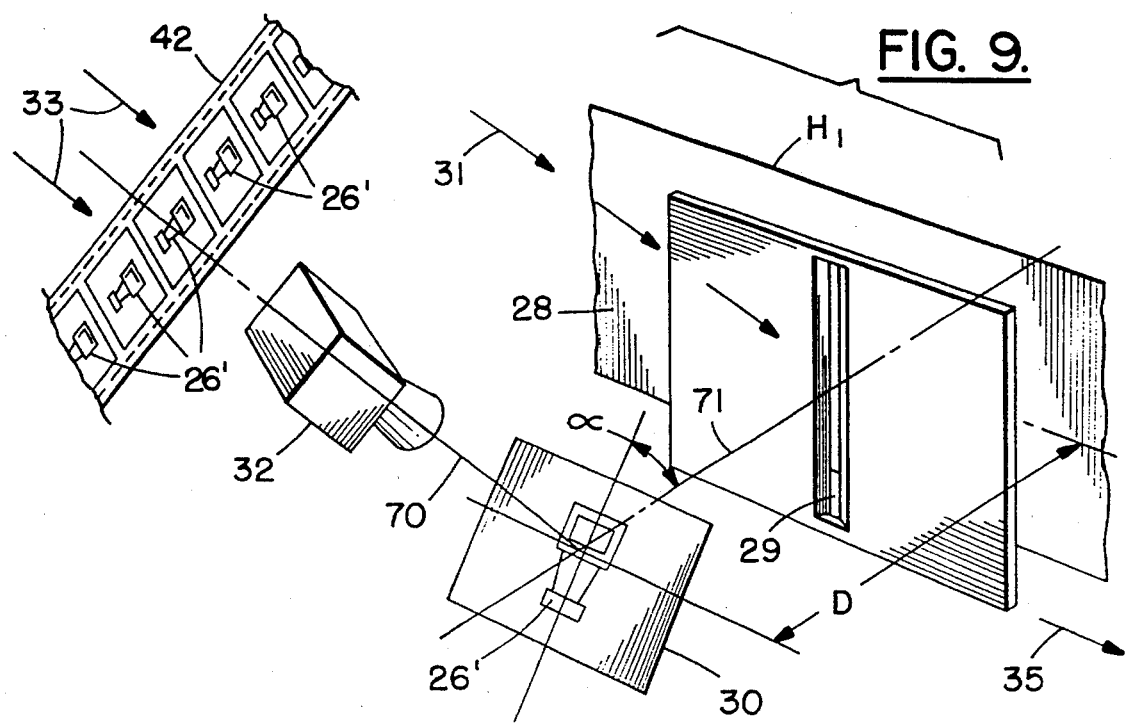
FIG. 9 is a schematic diagram illustrating the preparation of a $H_1$ hologram for the non-90° mode.

The preparation of a $H_1$ hologram for the non-90° case is shown in FIG. 9. The same procedures are used for this step as those discussed above in connection with FIG. 5 for the 90° case. The difference between the two cases is that in FIG. 5, diffusion screen 30 and film 42 are oriented parallel to slit aperture 29 and holographic plate 28, with the optical axis of projector 42 lying on the common normal to the screen, film, slit aperture, and plate, while in FIG. 9, diffusion screen 30 is oriented at the angle α with respect to slit aperture 29 and holographic plate 28, film 42 is oriented parallel to screen 30, and the optical axis of projector 42 lies on the common normal to the film and the screen. By means of these differences, the recorded images of slit aperture 29 on holographic plate 28 are oriented at the angle α with respect to the two-dimensional perspective views projected onto screen 30, and those two-dimensional perspective views are faithfully projected onto screen 30 from film 42, without distortion, as a result of the parallelism between the film and the screen.

The configuration shown in FIG. 9 results in somewhat reduced light intensity levels at slit aperture 29 because the light from diffusion screen 30 tends to be projected in the direction of line 70. Increased intensities can be achieved by orienting laser beam 33, film 42, and projector 32 along line 71 and shearing the film and the projector optics so that they are each oriented parallel to the plane of diffusion screen 30.

Figure 10:
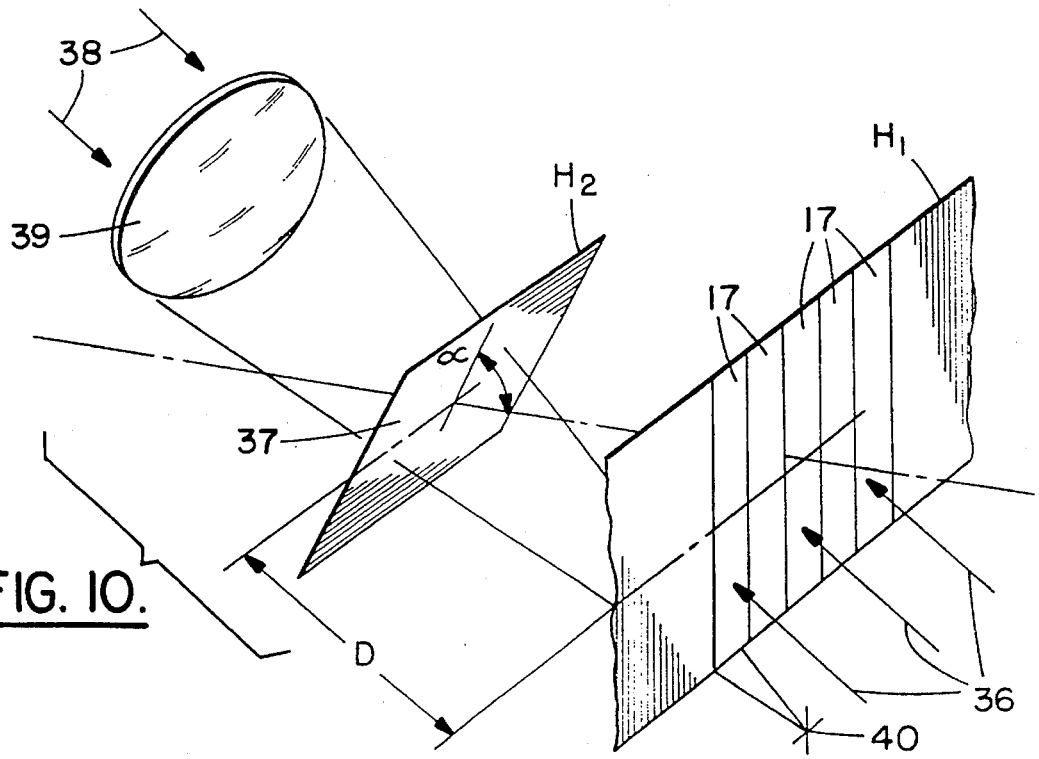
FIG. 10 is a schematic diagram illustrating the preparation of a $H_2$ hologram from the $H_1$ hologram of FIG. 9.

The preparation of a $H_2$ hologram for the non-90° case is shown in FIG. 10. The same procedures are used for this step as those discussed above in connection with FIG. 6 for the 90° case. The difference between the two cases is that in FIG. 6, the $H_1$ and $H_2$ holograms are parallel to one another, while in FIG. 10, the $H_2$ hologram is oriented at the angle α with respect to the $H_1$ hologram. By means of this difference, the images of slits 17 reconstructed from the $H_1$ hologram by beam 36 are recorded by the $H_2$ hologram at the angle α with respect to the surface of that hologram. Since it is the $H_2$ hologram, or a copy thereof, which forms holographic stereogram 13, reconstruction of slits 17 by means of light source 25 (see FIG. 8) results in the slits being in the vicinity of the user's eyes 22,23 as desired.

The procedures illustrated in FIGS. 9 and 10 are described more generally in the Summary of the Invention set forth above and in the claims. The relationship between the terms used therein and the structures shown in FIGS. 9 and 10 is as follows: the "first plane" referred to in step (a) is the plane which contains holographic plate 28 in FIG. 9; the "vertical" and "horizontal" axes referred to in steps (a) and (c) are along slit aperture 29 and arrow 35, respectively, in FIG. 9; the "image zone" referred to in step (b) comprises diffusion screen 30 in FIG. 9; the "second plane" referred to step (b) is the plane which contains diffusion screen 30 in FIG. 9; the "third plane" referred to in step (f) is the plane which contains the $H_1$ hologram in FIG. 10; and the "fourth plane" referred to in step (g) is the plane which contains holographic plate 37 in FIG. 10. The specific structures shown in these figures are, of course, not to be considered limiting of the scope of the invention as defined by the claims.

Although specific embodiments of the invention have been described and illustrated, it is to be understood that modifications can be made without departing from the invention's spirit and scope. For example, instead of preparing the $H_1$ hologram using the apparatus of FIGS. 5 and 9, i.e., film 42, projector 32, and diffusion screen 30, a variety of other types of apparatus can be used. For example, an electronic display or spatial modulator employing coherent light and located at the position of screen 30 can be used in place of the film, projector, and diffusion screen. Note that in FIG. 9, such a display or modulator would be oriented at the angle α with respect to holographic plate 28. Alternatively, the projector and diffusion screen can be retained and a spatial modulator used in place of film 42. Use of these variations is particularly appropriate when the two-dimensional perspective views are created by computer.

Similarly, general holographic techniques now known or subsequently developed can be used in the practice of the invention. For example, an achromatic image can be created using the technique of Benton, U.S. Pat. No. 4,445,749. In accordance with this technique, the plane containing viewing slits 17, i.e., plane 47 in FIGS. 1, 2, and 8, is tilted relative to the user's line of sight 19. It should be noted that this tilting is different from the tilting used in FIGS. 9 and 10 in the preparation of the $H_1$ and $H_2$ holograms of the invention. The tilting of FIGS. 9 and 10 is used to place slits 17 in the vicinity of the user's eyes. The tilting of the Benton patent, on the other hand, is concerned with the orientation of the slits assuming the slits are in the vicinity of the user's eye, that is, the Benton patent only deals with the 90° case, there being no disclosure or suggestion in that patent of a technique for handling the non-90° case addressed by the present invention.

As described above, a single holographic image has been superimposed upon the user's field of view. In certain applications, multiple holographic images may be desirable. These images can be formed using multiple holographic stereograms, each holographic stereogram being prepared in accordance with the invention, or the multiple images can be formed using a single holographic stereogram, with individual images being projected by means of different light sources located at different positions relative to the stereogram. For example, in a heads-down display for an automobile, a low fuel condition image can be superimposed on the instrument panel when one light source is activated, and a check engine image can be superimposed on the panel when another light source is activated. If desired, both images can be generated simultaneously if both conditions are present by activating both light sources at the same time.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. An optical system for displaying first and second images to a user comprising:

(a) a viewing window for viewing the first image, said first image being non-holographic and said viewing window presenting a field of view of the first image to the user;

(b) a substantially transparent holographic stereogram for forming the second image, said holographic stereogram and said second image being in said field of view; and (c) a source of illumination for illuminating the holographic stereogram to form the second image;

said holographic stereogram comprising a recording medium which contains a diffraction pattern which upon illumination by the source of illumination produces a set of two-dimensional perspective views and a set of viewing slits, one viewing slit for each of the two-dimensional perspective views.

2. The optical system of claim 1 wherein the holographic stereogram has a physical volume and the second image is formed close to that physical volume.

3. The optical system of claim 1 wherein the recording medium defines a plane, the user has a line of sight, and the line of sight is substantially orthogonal to the plane.

4. The optical system of claim 1 wherein the recording medium defines a plane, the user has a line of sight, and the line of sight is substantially non-orthogonal to the plane.

5. The optical system of claim 4 wherein the set of viewing slits are located along the line of sight in the vicinity of the user's eyes.

6. The optical system of claim 4 wherein the viewer perceives the second image to be substantially orthogonal to the line of sight.

7. The optical system of claim 4 wherein the viewer perceives the second image to be translated relative to the center of the recording medium.

8. The optical system of claim 4 wherein the viewer perceives the second image to be (i) substantially orthogonal to the line of sight and (ii) translated relative to the center of the recording medium.

9. The optical system of claim 1 wherein the user perceives the second image as being beyond the viewing window.

10. The optical system of claim 1 wherein the user perceives the second image as being intersected by the viewing window.

11. The optical system of claim 1 wherein the user perceives the second image as being in front of the viewing window.

12. The optical system of claim 1 wherein the holographic stereogram is carried by the viewing window.

13. The optical system of claim 1 wherein the holographic stereogram is a reflection hologram.

14. The optical system of claim 1 wherein the source of illumination is a broadband source.

15. The optical system of claim 14 further comprising a color filter associated with the broadband source.

16. The optical system of claim 1 wherein the viewing window is selected from the group consisting of a windshield of a vehicle, a transparent cover for an instrument panel, a transparent cover for the playing field of an arcade game, and a transparent cover for the scoreboard of an arcade game.

17. An optical system for displaying first, second, and third images to a user comprising:

(a) a viewing window for viewing the first image, said first image being non-holographic and said viewing window presenting a field of view of the first image to the user;

(b) a substantially transparent holographic stereogram for forming the second and third images, said holographic stereogram and said second and third images being in said field of view;

(c) a first source of illumination for illuminating the holographic stereogram to form the second image; and (d) a second source of illumination for illuminating the holographic stereogram to form the third image;

said holographic stereogram comprising a recording medium which contains a diffraction pattern which upon illumination by the first source of illumination produces a set of first two-dimensional perspective views and a set of viewing slits, one viewing slit for each of the first two-dimensional perspective views and which upon illumination by the second source of illumination produces a set of second two-dimensional perspective views and a set of viewing slits, one viewing slit for each of the second two-dimensional perspective views.

* * * * *